United States Patent [19]

Spasoff

[11] 4,323,181
[45] Apr. 6, 1982

[54] BELT-MOUNTED FISHING TACKLE CARRIER

[76] Inventor: John Spasoff, P.O. Box 5757, Renton, Wash. 98031

[21] Appl. No.: 226,213

[22] Filed: Jan. 19, 1981

[51] Int. Cl.³ ............................................. A45F 5/00
[52] U.S. Cl. .................................. 224/253; 224/920; 43/21.2; 43/54.5 R; 43/55
[58] Field of Search ............... 224/253, 148, 224, 225, 224/241, 252, 272, 920; 43/21.2, 54.5 R, 55

[56] References Cited

U.S. PATENT DOCUMENTS

| | | | |
|---|---|---|---|
| 1,549,400 | 8/1925 | Wimler | 224/241 X |
| 1,556,127 | 10/1925 | Pruett | 224/920 X |
| 2,436,109 | 2/1948 | Kollman | 43/55 |
| 2,560,381 | 7/1951 | Babington | 224/920 X |
| 2,576,624 | 11/1951 | Miller | 43/21.2 |
| 2,817,472 | 12/1957 | Parkhurst | 224/920 X |
| 3,317,097 | 5/1967 | Giordano | 224/182 |
| 3,819,095 | 11/1971 | Snyder | 224/248 |
| 3,886,679 | 6/1975 | Marcell | 43/55 |
| 3,917,134 | 11/1975 | Tumlinson | 224/224 |

Primary Examiner—Steven M. Pollard
Attorney, Agent, or Firm—Seed, Berry, Vernon & Baynham

[57] ABSTRACT

A belt-mounted tackle carrier is an integral structure preferably comprising a body which provides both a surface and a means for mounting the construction to a belt, a fishing-rod support compartment, an elastic tool-retaining strap which is disposed about the compartment, and various bait-carrying compartments. The bait-carrying compartments may alternatively include a utility compartment having a spring-loaded lid, or a bait-jar mounting bracket, which may also have a spring-loaded cover.

6 Claims, 3 Drawing Figures

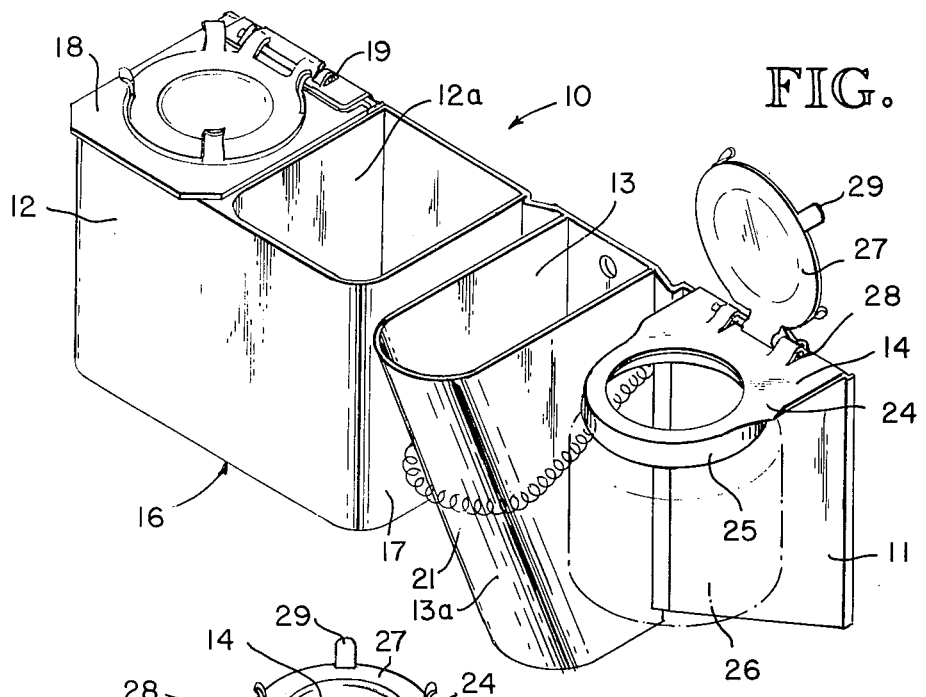
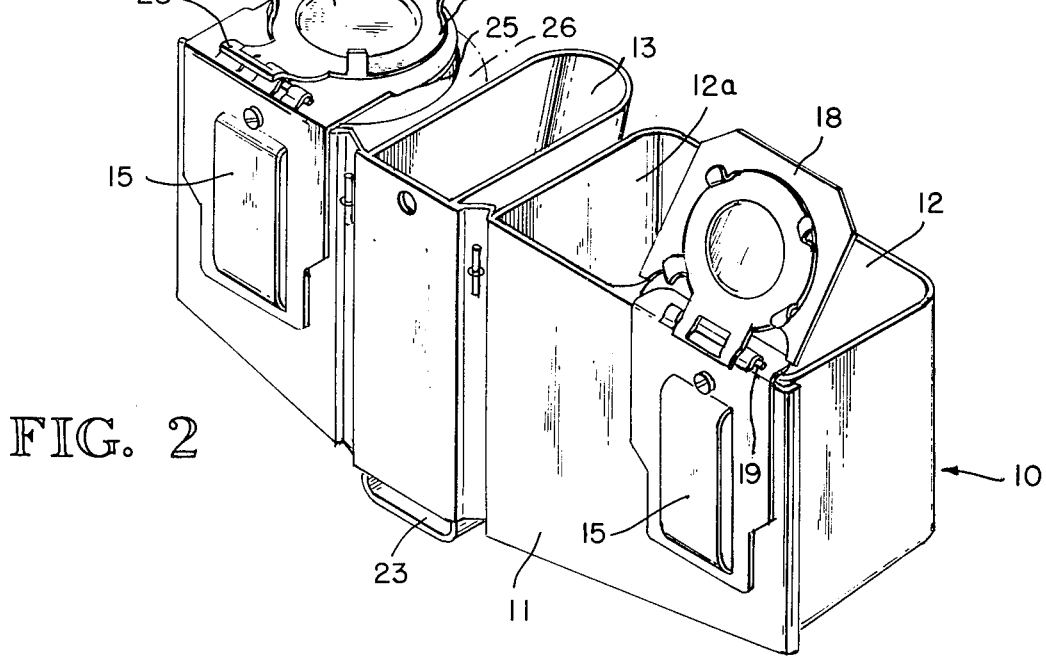
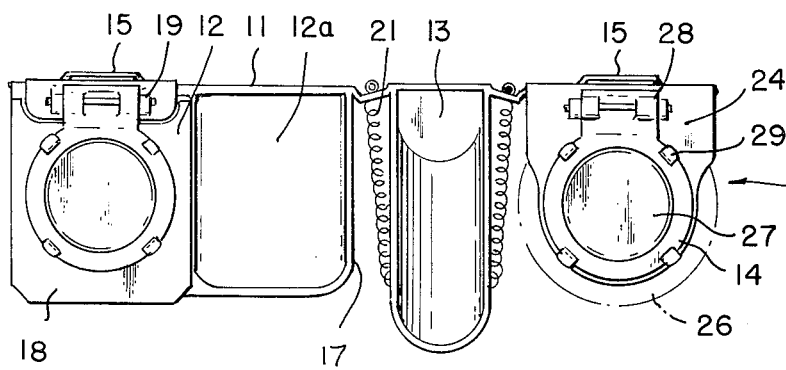

BELT-MOUNTED FISHING TACKLE CARRIER

FIELD OF THE INVENTION

The present invention relates to sports fishing accessories and, more particularly, to a belt-mounted tackle carrier.

BACKGROUND OF THE INVENTION

Many belt-mounted accessories for fishing tackle and the like have been offered. Typically, such accessories are strung as independent units onto a belt. Such a design makes it inconvenient to provide a plurality of accessories on a belt. The plurality of independent accessories is also inconvenient to store.

Accordingly, the present invention provides a tackle carrier which is belt mounted and which is carried on an integrated support body. The preferred carrier provides various compartments, which may include a box-like utility compartment, a bait-jar mounting bracket, and means for retaining various tools, such as pliers and the like.

When a fisherman baits hooks or attaches tackle to his fishing line, he sometimes cannot conveniently rest his pole because of the weather, his surroundings, or the delicate nature of the rod and reel. The carrier of this invention, accordingly, includes means for supporting the handle portion of a fishing rod, freeing the fisherman's two hands to complete his task.

SUMMARY OF THE INVENTION

A belt-mounted tackle carrier is an integral structure preferably comprising a body (which provides a surface and a means for mounting the construction to a belt), a fishing-rod support compartment, an elastic tool-retaining strap (which is disposed about the compartment), and bait-carrying compartments. The bait-carrying compartments may include a utililty compartment, preferably having a spring-loaded lid, and a bait-jar mounting bracket, also preferably having a spring-loaded cover.

BRIEF DESCRIPTION OF THE DRAWINGS

FIG. 1 is a front-perspective view of a preferred carrier of this invention.

FIG. 2 is a rear-perspective view of the carrier of FIG. 1.

FIG. 3 is a top view of the carrier of FIG. 1.

DETAILED DESCRIPTION OF A PREFERRED EMBODIMENT

A belt-mounted tackle carrier 10 may be molded as an integral structure by such means as rotational molding, or may be joined into an integrated structure from component elements. Preferably, the carrier is able to conform to the shape of the body so that it may be worn more comfortably.

The carrier 10 preferably comprises a body 11, a utility compartment 12, a fishing rod support compartment 13, and a bait-jar mounting bracket 14. The body 11 is preferably a substantially flat sheet of semi-rigid material having an approximately rectangular configuration. The body 11 may be stiffened by ribs and flanged edges (not shown). Preferably, it remains flexible enough to conform to a body shape when used. The rearward side of the body 11 is provided with belt loops 15 through which a belt (not shown) may be passed. It has been found to advantage to configure the lower corners of the body 11 with deeply cut radius edges to permit the wearer to bend with greater mobility.

The utility compartment 12 may be a substantially rectangular enclosure having a bottom wall 16 and sidewalls 17 integrally molded and issuing from the exterior side of the body 11. A cover 18 preferably is pivotally mounted on a spring-loaded hinge 19 to the body 11 to rest contiguously at the uppermost terminal edges of the sidewalls 17. Preferably, the cover 18 overlies one section of the utility compartment 12. A second section 12a preferably is open at the top. This open section 12a preferably is sized so that it may function as a cup holder.

The fishing rod compartment 13 is preferably a substantially U-shaped, cross-sectional configuration and is joined at the terminal edges thereof to the body 11. The outer edge 13a of the compartment 13 inclines outwardly from its lower to its upper end to form a substantially rigid pocket which is open at its upper end. This structure preferably permits the compartment 13 to support a fishing rod (not shown) which will project outwardly from the wearer's body when the handle is inserted into the compartment 13. The transverse dimension of the compartment 13 permits only nominal lateral movement of the rod with respect to the compartment 13. Having an open U-shaped top allows easy insertion of the rod into the compartment 13. When the rod is rested in the compartment 13, action on the lure can be undertaken without removing the rod by pivoting the rod about its bottom.

The compartment 13 preferably has an elastic member, such as a coil spring 21, attached about its periphery, to support various tools 22 useful to the fisherman between the spring 21 and compartment 13. The spring 21 is preferably fastened at its terminal ends to the body 11 about the exterior wall of the compartment 13. The lower end of the compartment 13 may further include a vent 23 through which water or other debris may pass.

The bait-jar mounting bracket 14 preferably comprises a rigid flange 24 issuing perpendicularly from the body 11, a threaded jar coupling 25 by which a bait jar 26 may be threadably attached, and a cover 27. The cover 27 is preferably mounted to the uppermost terminal side of the flange 24 by means of a spring-loaded hinge 28. Raising the cover 27 gives access to the jar 26 through a hole in the flange 24. The cover 27 may also have a clip top 29 which is sized to hold the lid for the bait jar 26.

Those skilled in the art could make many changes in the described invention without altering the inventive concepts and principles embodied therein. Therefore, this invention should be limited only if such limitation is necessary due to a fair reading of the prior art or of the scope and nature of the appended claims.

I claim:
1. A belt-mounted tackle carrier comprising:
   a body fabricated of a suitable, semi-rigid sheet material and having belt loops on one side;
   a fishing-rod support compartment issuing in an upstanding orientation from the body on the side opposite the belt loops, the compartment being a substantially rigid pocket open at its upper end;
   a utility compartment having a hingedly mounted cover; and
   a bait-jar mounting bracket having a threaded jar coupling and a hingedly mounted cover.

2. The carrier of claim 1 wherein said lower end of the rod support compartment has a vent through which water and small debris may pass.

3. The carrier of claim 1, further comprising an elastic member to support tools which is fastened at its terminal ends to said body about the exterior wall of the rod support compartment.

4. The carrier of claim 3 wherein the utility compartment has a second section which is open at the top and which is sized so that it may function as a cup holder.

5. The carrier of claim 4 wherein the rod support compartment allows action on the lure without removal of the rod.

6. The carrier of claim 5 wherein the bait-jar mounting bracket has a clip-top lid holder.

* * * * *